United States Patent
Amori et al.

(10) Patent No.: US 6,736,229 B1
(45) Date of Patent: May 18, 2004

(54) ENERGY STORAGE SYSTEM FOR A VEHICLE

(75) Inventors: Richard Thomas Amori, Saline, MI (US); Josephine S. Lee, Novi, MI (US); Frank Louis Stellon, Farmington Hills, MI (US); Harold Diuguid Wiard, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/248,953

(22) Filed: Mar. 5, 2003

(51) Int. Cl.[7] .............................. B60R 16/04
(52) U.S. Cl. .................... 180/68.5; 280/834
(58) Field of Search ............... 180/69.5, 68.5, 180/314; 280/834, 830; 137/267; 429/96–100

(56) References Cited

U.S. PATENT DOCUMENTS

| | | | | |
|---|---|---|---|---|
| 1,606,028 A | * | 11/1926 | Head ........................ | 137/261 |
| 2,871,967 A | * | 2/1959 | Wallace ..................... | 180/69.5 |
| 3,565,201 A | * | 2/1971 | Petsinger .................. | 180/69.5 |
| 3,608,660 A | * | 9/1971 | Smith et al. ............... | 180/69.5 |
| 3,681,609 A | * | 8/1972 | Boese et al. ................ | 290/16 |
| 3,830,326 A | * | 8/1974 | Hartung ..................... | 180/305 |
| 4,616,872 A | * | 10/1986 | Akira et al. ............. | 296/190.11 |
| 5,518,272 A | | 5/1996 | Fukagawa et al. | |
| 5,785,136 A | | 7/1998 | Falkenmayer et al. | |
| 5,794,979 A | * | 8/1998 | Kasuga et al. ............. | 280/834 |
| 5,908,077 A | | 6/1999 | Moore | |
| 6,042,071 A | * | 3/2000 | Watanabe et al. .......... | 248/313 |
| 6,095,267 A | | 8/2000 | Goodman | |
| 6,213,145 B1 | * | 4/2001 | Crook et al. ............... | 137/260 |
| 6,220,383 B1 | * | 4/2001 | Muraki et al. ............ | 180/68.5 |
| 6,257,360 B1 | | 7/2001 | Wozniak et al. | |

FOREIGN PATENT DOCUMENTS

EP 338609 * 10/1989
JP 1-160755 * 6/1989

* cited by examiner

Primary Examiner—Bryan Fischmann
(74) Attorney, Agent, or Firm—Dykema Gossett PLLC; Carlos L. Hanze

(57) ABSTRACT

An energy storage system for a vehicle includes a compressed gas storage tank having a generally cylindrical outer wall and a generally cylindrical battery having a partially triangular section defined in part by a concave surface extending along and nested with at least a portion of the cylindrical outer wall of the gas storage tank.

22 Claims, 3 Drawing Sheets

ENERGY STORAGE SYSTEM FOR A VEHICLE

BACKGROUND OF INVENTION

1. Field of the Invention

The present invention relates to an energy storage system for a vehicle having both a compressed gaseous fuel tank and an electric storage battery.

2. Disclosure Information

Vehicles such as hybrid electric vehicles having fuel-burning engines and fuel cell vehicles, both powered by compressed fuel gas such as natural gas or hydrogen, typically utilize generally cylindrical fuel storage tanks. The cylindrical geometry of such tanks is dictated by the relatively high pressures necessary to store an adequate amount of fuel. Needless to say, cylindrical tanks do not package well in automotive vehicles, notwithstanding that engineers have striven for years to achieve acceptable packaging coupled with acceptable vehicle range. The need for packaging an electrical storage battery within either a hybrid electric vehicle or a fuel cell vehicle further compounds the problems faced by vehicle designers. Such batteries are typically not package-efficient and in fact, have frequently been of either a flat construction or square sectional construction, neither which is particularly conducive to packaging within the confines of an automotive vehicle.

The inventors of the present energy storage system have solved many of the problems which plagued known battery and compressed gas storage systems by providing a nesting relationship between an electric storage battery and a generally cylindrical compressed gas storage tank. The geometry of the electric storage battery's case takes advantage of the geometry found in a conventional automotive vehicle at the forward point of the traditional luggage compartment, by conforming with the seat back bulkhead of the adjacent passenger compartment, while at the same time, the battery case conforms with the cylindrical outer wall of the compressed gas storage tank.

SUMMARY OF INVENTION

An energy storage system for a vehicle includes a gas storage tank for compressed fuel gas, with the tank having a generally cylindrical outer wall and two arcuate ends, and a generally cylindrical storage battery having a concave surface extending along and nested with at least a portion of the generally cylindrical outer wall of the gas storage tank. The battery preferably further includes at least one additional surface extending parallel to a wall of a vehicular compartment into which the gas storage tank and the storage battery are installed.

The concave surface of the storage battery defines one portion of a generally triangular cross section of the storage battery. The other two portions of the generally triangular cross section are defined by the floor of the storage compartment into which the gas storage tank and storage battery are installed and a segment of the battery's exterior surface which is generally planar and which is parallel to a seat back bulkhead defining an adjoining passenger compartment.

According to another aspect of the present invention, a storage battery has two generally rectangular ends abutting at least a portion of the arcuate ends of the gas storage tank. The generally rectangular ends include ports allowing the passage of cooling air into the storage battery.

The compartment to which the storage battery and gas storage tank are installed preferably extends laterally across the width of the vehicle body. The storage battery preferably further includes a plurality of battery cell groups, with each group extending axially in a direction parallel to the generally cylindrical outer wall of the gas storage tank. In this manner, the storage battery and the gas storage tank may be tucked into close proximity of the rear seatback of the vehicle, so as to minimum the space occupied by the storage battery and the gas storage tank.

According to another aspect of the present invention, a storage battery further includes a thermal management system for selectively passing either cabin or ambient air through the storage battery.

According to another aspect of the present invention, a method for providing an energy storage system for a vehicle includes the steps of securing a storage battery within a fuel storage compartment immediately adjacent a passenger compartment of the vehicle, with the storage battery having a first exterior surface which is generally planar and which is parallel to a seatback bulkhead defining an adjoining passenger compartment, and a second exterior surface which is concave, with the first and second surfaces combining with the surface which is parallel to the floor of the fuel storage compartment to define a generally triangular cross section of the storage battery. The present method further includes securing a cylindrical compressed fuel gas tank in the fuel storage compartment, with at least a portion of the fuel tank being nested with the concave surface of the storage battery.

It is an advantage of the present invention that an energy storage system according to this invention will allow maximum energy density within the fuel storage space of a hybrid electrical vehicle or fuel cell vehicle. In other words, a maximum amount of electrical charge storage and compressed gas storage will be permitted by the inter-nesting relationship between the storage battery and the gas storage tank.

It is a further advantage of the present invention that the present energy storage system will utilize minimum space within a laterally confined energy storage compartment within a vehicle.

It is another advantage of the present invention that the ability to use ambient air for cooling the storage battery reduces the need for conditioned air drawn from the vehicle's passenger compartment. This in turn reduces the amount of energy drawn from the battery system to operate a refrigeration system.

It is another advantage that the present system permits maximum bimodal energy storage within a minimum package volume.

Other advantages, as well as objects and features of the present invention, will become apparent to the reader of this specification.

DETAILED DESCRIPTION

Figure 1:
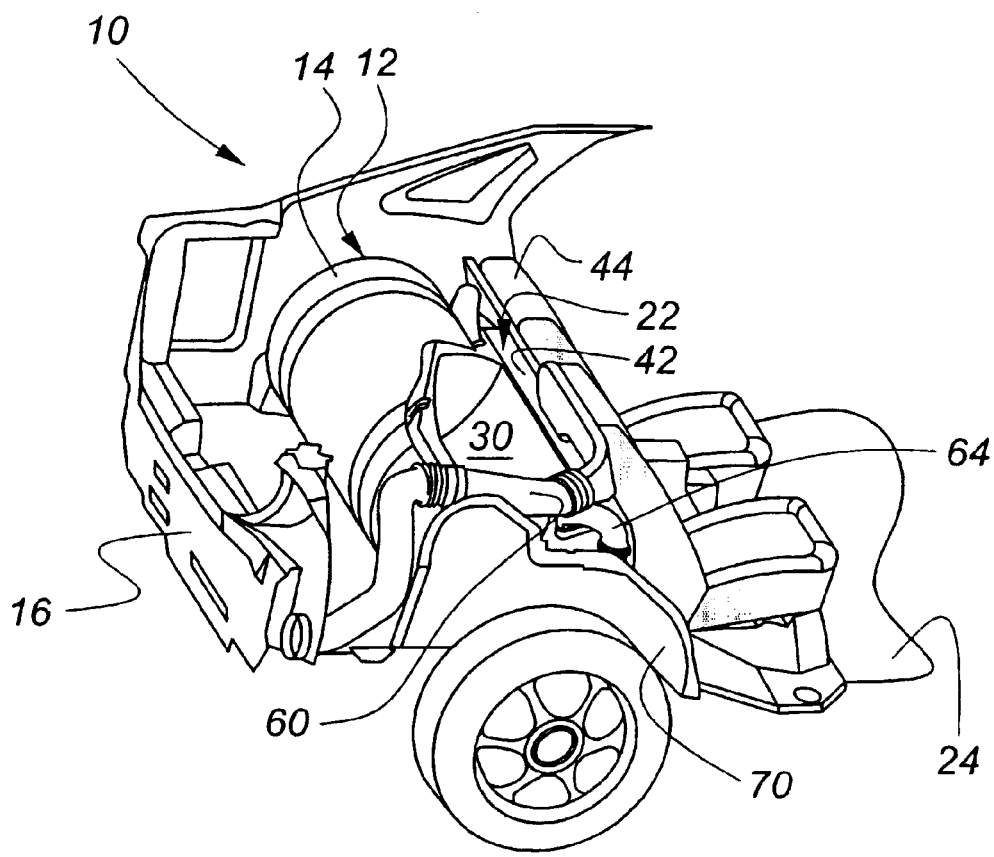
FIG. 1 is a side view of a vehicle having a energy storage system according to the present invention.

As shown in FIG. 1, vehicle 10 has compressed gas storage tank 12 mounted transversely across the substantial width of the vehicle, with the tank being located behind seat back 44 and rear seat strainer or bulkhead 42. Because gas storage tank 12 has a conventional circular cross-section necessitated by the high pressures encountered with compressed fuel gases such as compressed natural gas or compressed hydrogen, gas storage tank 12 creates a packaging problem which is solved by the present invention.

With fuel cell or hydrogen ICE hybrid electric vehicles, for example, the fuel storage problem posed by the awkward configuration of compressed gas tanks is further compounded by the need for a substantial electric storage battery. As noted above, traditional batteries typically had a flat configuration which is not particularly advantageous for a vehicle such as a passenger car. This problem is compounded because a good portion of the traditional trunk is pre-empted by gas storage tank 12. Accordingly, the inventors of the present invention propose a storage battery 22 having a generally triangular cross-section. The battery itself has a generally cylindrical case 26. As used term herein, the term "generally cylindrical" does not refer necessarily to a right circular cylinder, but rather to a more generic definition of cylinder as embraced in classic geometry. FIG. 1 shows that storage battery 22 has a concave section in contact with gas storage tank 12. Thus, concave surface 30 extends along and is nested with at least a portion of the generally cylindrical outer wall 14 of gas storage tank 12. Gas storage tank 12 is mounted to floor 46 of vehicle 10. Similarly, storage battery 22 is mounted to floor 46. The floor contacting surface of storage battery 22 combines with concave surface 30 and slant surface 38 (FIG. 5), which contacts rear seat strainer or bulkhead 42 (FIG. 1), to define one portion of a generally triangular cross-section of storage battery 22.

Figure 3:
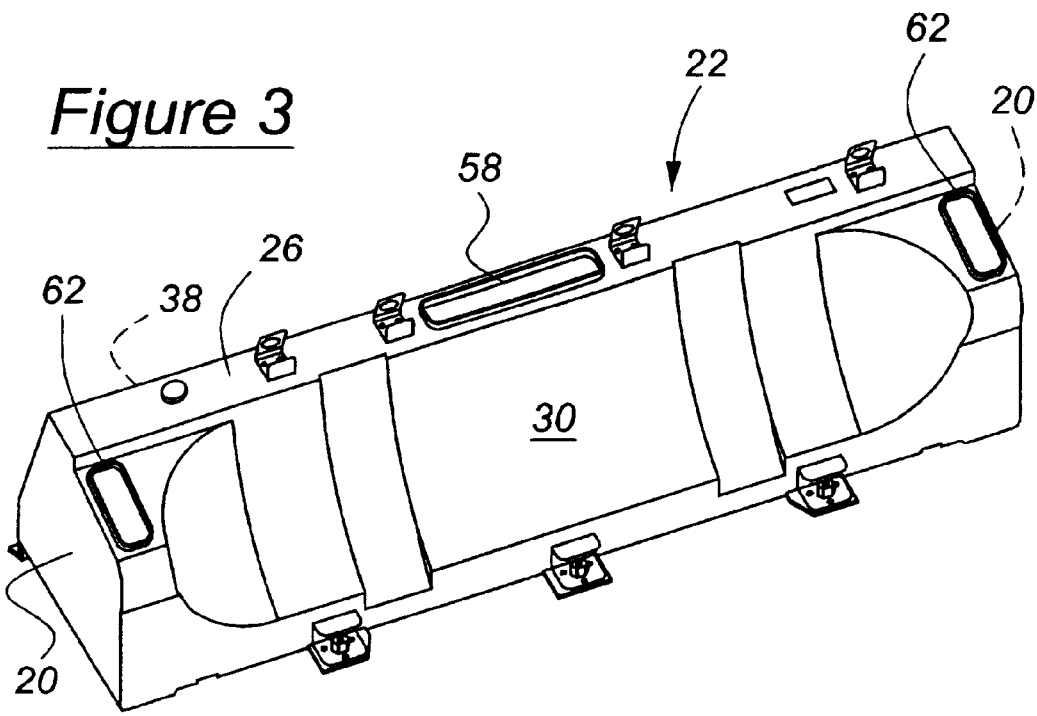
FIG. 3 is a perspective view of a storage battery according to one aspect of the present invention.
Figure 4:
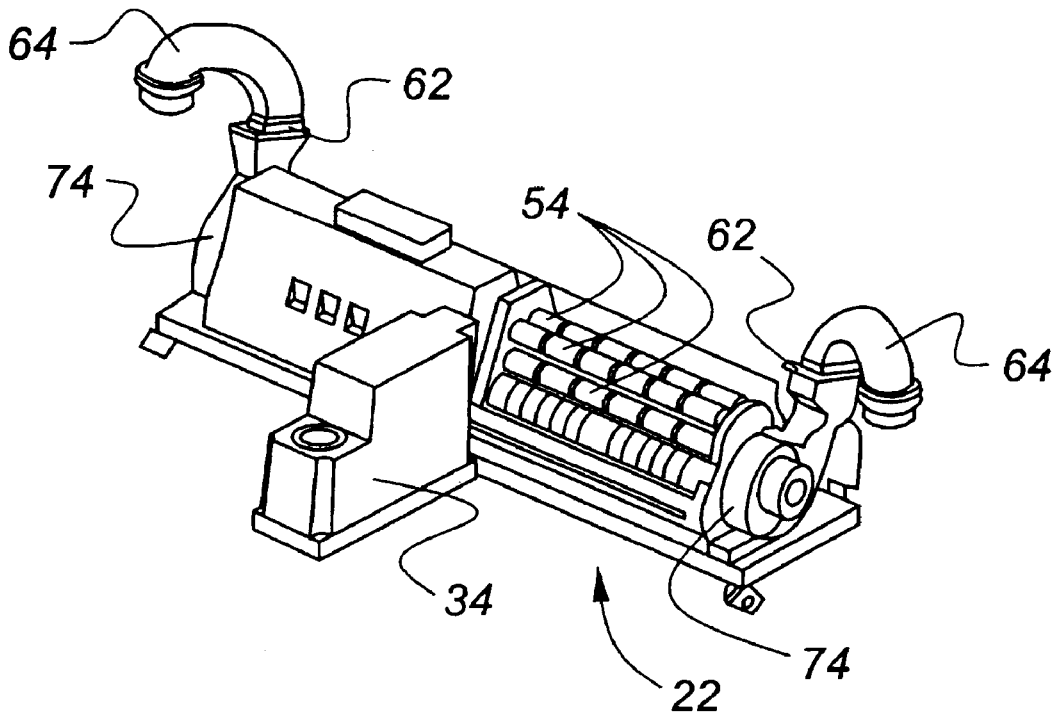
FIG. 4 is a front perspective view of the storage battery shown in FIG. 3.

As shown in FIG. 3, concave surface 30 of storage battery 22 is formed in one portion of storage battery 22. Storage battery 22 further has generally rectangular ends 20 which abut a portion of arcuate ends 18 of gas storage tank 12. Generally rectangular ends 20 house circulating blowers 74 shown in FIG. 4. Blowers 74 move cooling air from air inlet 58 (FIG. 3) to air outlets 62.

Figure 2:
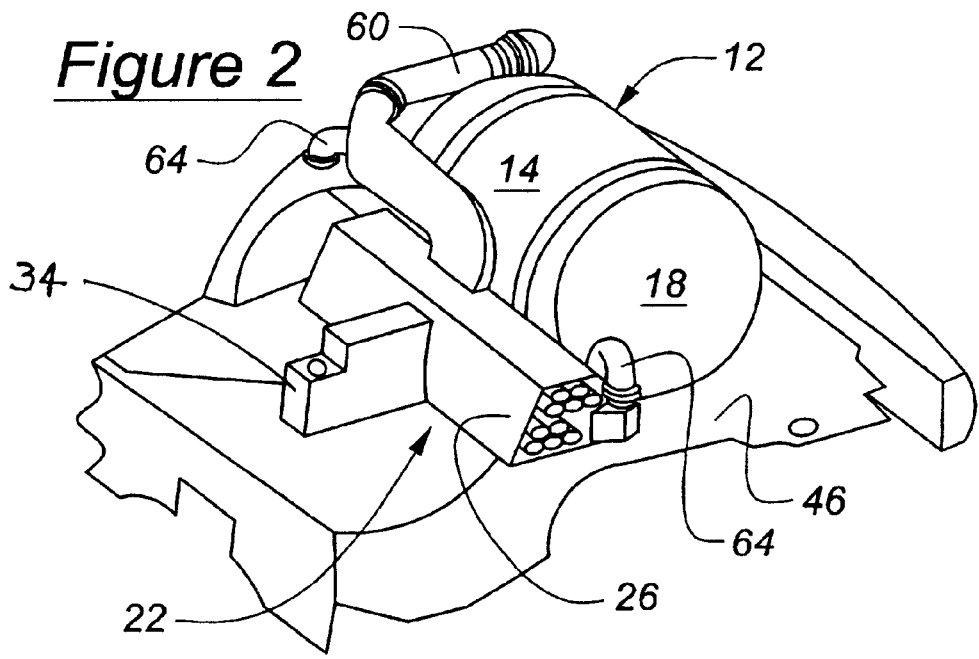
FIG. 2 is a cut-away perspective view of an energy storage system according to the present invention.

FIGS. 1 and 2 illustrate snorkel tube 60, which draws ambient air from an area of the vehicle extending between rear fascia 16 (FIG. 1) and the rearmost portion of the vehicle body. Snorkel tube 60 conducts ambient air into air inlet 58, to allow flow through the interior of storage battery 22 and into air outlets 62, where air is discharged through elbows 64 and into wheelhouses 70 (FIG. 1). As an alternative, snorkel tube 60 may have a branch passing through rear seat strainer 42 and into passenger compartment 24. In this case, blowers 74 will draw conditioned air from the passenger cabin and into the interior of battery 22.

Battery 22 has a console 34 extending forwardly into the passenger compartment 24. Console 34 includes power electronics and switching contacts for managing the distribution of electrical power associated with battery 22.

Figure 5:
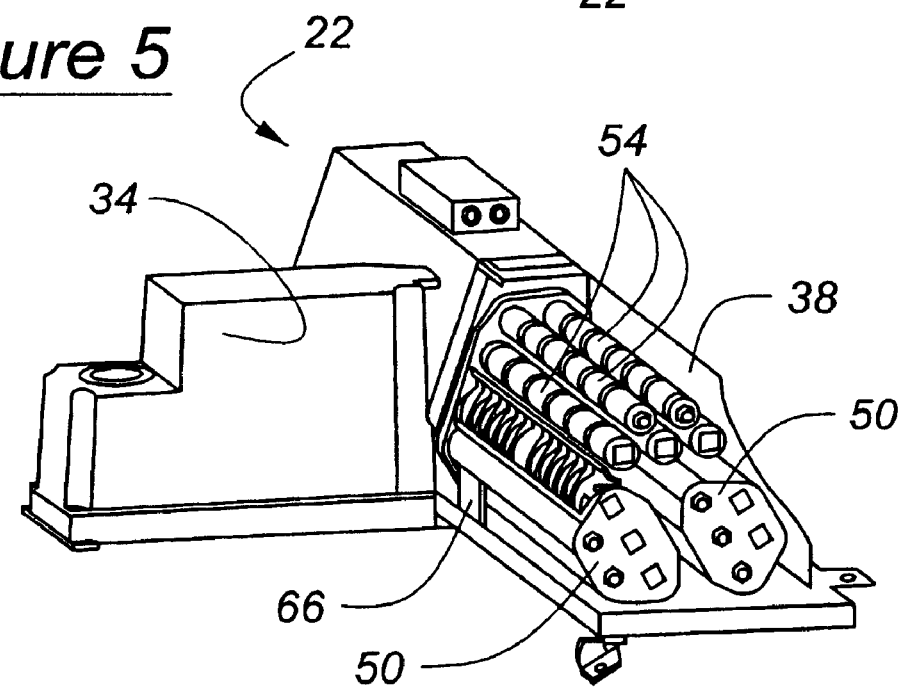
FIG. 5 is a perspective view of a section through the battery of FIGS. 3 and 4 showing pluralities of battery cell groups within the storage battery.

FIG. 5 illustrates a sectional view of battery 22 showing three cell groups 50. Each cell group 50 extends axially in a direction parallel to the outer wall 14 of gas storage tank 10. Each cell group 50 comprises a number of cell stacks 54; in one embodiment each cell group 50 includes five cell stacks 54 of roughly D size cells, yielding a total cell count of 180 cells. In one embodiment, nickel metal hydride cells have been useful for producing a battery according to the present invention. The arrangement of cell groups 50 and cell stacks 54 allows cooling air to be readily drawn into air inlet 58 and out through air outlets 62. However, in the event that heating of cell group 50 is needed due to cool ambient conditions, electric heater 66 is provided within the interior of battery case 26.

The present invention further includes a method for providing an energy storage system for a vehicle, particularly a hybrid electric vehicle or fuel cell vehicle. According to this method, storage battery 22 is secured within a fuel storage compartment adjacent passenger compartment 24 and immediately adjacent rear seat bulkhead 42 and compressed gas tank 12. The triangular cross-section of battery 22 takes particular advantage of the space defined in part by compressed gas storage tank 12 by providing a concave surface 30, and a slant surface 38 and a lower surface 28 in contact with floor 46. Taken together, slant surface 38, concave surface 30, and lower surface 28 define a generally triangular cross-section of storage battery 22. Nesting of a portion of outer cylindrical wall 14 of gas storage tank 10 with concave surface 30 allows storage battery 22 and gas.storage tank 12 to occupy a minimum possible volume of the vehicle extending behind rear seat bulkhead 42, so as to permit maximum usage of the interior volume of the vehicle.

Although the present invention has been described in connection with particular embodiments thereof, it is to be understood that various modifications, alterations, and adaptations may be made by those skilled in the art without departing from the spirit and scope of the invention. It is intended that the invention be limited only by the appended claims.

What is claimed is:

1. An energy storage system for a vehicle, comprising:
    a gas storage tank for compressed fuel gas, having a generally cylindrical outer wall and two arcuate ends; and
    a generally cylindrical storage battery having a concave surface extending along and nested with at least a portion of the generally cylindrical outer wall of the gas storage tank.

2. An energy storage system according to claim 1, wherein said storage battery further comprises at least one additional surface extending parallel to a wall of a vehicular compartment into which the gas storage tank and the storage battery are installed.

3. An energy storage system according to claim 1, wherein said concave surface of said storage battery defines one portion of a generally triangular cross section of said storage battery.

4. An energy storage system according to claim 1, wherein said storage battery has two generally rectangular ends abutting at least a portion of the arcuate ends of said gas storage tank.

5. An energy storage system according to claim 1, further comprising a compartment extending laterally across substantially the entire width of a vehicle body, with said gas storage tank and said storage battery being housed within said compartment.

6. An energy storage system according to claim 1, wherein said vehicle comprises a hybrid electric vehicle.

7. An energy storage system according to claim 1, wherein said vehicle comprises a fuel cell vehicle.

8. An energy storage system according to claim 1, wherein said vehicle comprises a hydrogen internal combustion engine hybrid electric vehicle.

9. An energy storage system according to claim 1, wherein said fuel gas comprises hydrogen.

10. An energy storage system according to claim 1, wherein said fuel gas comprises natural gas.

11. An energy storage system according to claim 1, wherein said storage battery further comprises a plurality of battery cell groups, with each group extending axially in a direction parallel to the generally cylindrical outer wall of the gas storage tank.

12. An energy storage system according to claim 1, wherein said storage battery further comprises a ventilation system for passing ambient air through the storage battery.

13. An energy storage system according to claim 1, wherein said storage battery further comprises a ventilation system for passing cabin air through the storage battery.

14. An energy storage system according to claim 1, wherein said storage battery further comprises a ventilation system for selectively passing either cabin air or ambient air through the storage battery.

15. An energy storage system according to claim 1, wherein said storage battery further comprises an electrically powered heater for warming the interior of the storage battery.

16. An energy storage system according to claim 1, wherein said vehicle comprises a hydrogen internal combustion engine hybrid electric vehicle.

17. A vehicle having an energy storage system, comprising:
- a fuel storage compartment separated from a passenger compartment of the vehicle;
- a gas storage tank for compressed fuel gas, having a generally cylindrical outer wall and two arcuate ends, with said gas storage tank being mounted within said fuel storage compartment; and
- an elongate storage battery having a generally rectangular cross section, with said storage battery further having a relieved concave surface extending along and nested with at least a portion of the generally cylindrical outer wall of the gas storage tank and at least one generally planar surface extending along a wall of said fuel storage compartment.

18. A vehicle according to claim 17, wherein said vehicle comprises a hybrid electric vehicle.

19. A vehicle according to claim 17, wherein said vehicle comprises a fuel cell vehicle.

20. A vehicle according to claim 17, wherein said storage battery further comprises a plurality of battery cell groups, with each group extending axially in a direction parallel to the generally cylindrical outer wall of the gas storage tank.

21. A vehicle according to claim 17, wherein said storage battery further comprises a console area projecting into a passenger compartment of the vehicle.

22. A method for providing an energy storage system for a vehicle, comprising the steps of:
- securing a storage battery within a fuel storage compartment immediately adjacent a passenger compartment of the vehicle, with the storage battery comprising a first exterior surface which is generally planar and which is parallel to a seat back in the adjoining passenger compartment and a second exterior surface which is concave, with said first and second surfaces combining with a third exterior surface which is parallel to a floor of said fuel storage compartment to define a generally triangular cross section of the storage battery; and
- securing a cylindrical compressed fuel gas tank in the fuel storage compartment, with at least a portion of the fuel tank being nested with the concave surface of said storage battery.

\* \* \* \* \*